United States Patent
Chen et al.

(10) Patent No.: US 7,694,624 B2
(45) Date of Patent: *Apr. 13, 2010

(54) CABINET DESIGN OF FILTER HOLDER FOR PRESSURIZED ESPRESSO MACHINES

(75) Inventors: Andrew Yuen Chin Chen, Hong Kong (HK); Sum Fat Poon, Hong Kong (HK)

(73) Assignee: Electrical & Electronics Limited, Hong Kong (HK)

( * ) Notice: Subject to any disclaimer, the term of this patent is extended or adjusted under 35 U.S.C. 154(b) by 714 days.

This patent is subject to a terminal disclaimer.

(21) Appl. No.: 10/584,421

(22) PCT Filed: Dec. 23, 2004

(86) PCT No.: PCT/US2004/043422

§ 371 (c)(1),
(2), (4) Date: Jun. 23, 2006

(87) PCT Pub. No.: WO2005/063092

PCT Pub. Date: Jul. 14, 2005

(65) Prior Publication Data

US 2007/0151458 A1    Jul. 5, 2007

(30) Foreign Application Priority Data

Dec. 23, 2003  (EP) .................................. 03029686

(51) Int. Cl.
*A47J 31/057*    (2006.01)
(52) U.S. Cl. ...................................... 99/302 R
(58) Field of Classification Search ............... 99/302 R, 99/302 C, 302 FB, 302 P, 292, 296, 297, 99/279, 289 R, 295
See application file for complete search history.

(56) References Cited

U.S. PATENT DOCUMENTS 1,750,068 A    3/1930  Torriani (Continued)

FOREIGN PATENT DOCUMENTS

AU    2004203097    7/2004

(Continued)

OTHER PUBLICATIONS

European Search Report for Electrical & Electronics Limited, European Application No. EP04002983, Filed Feb. 11, 2004 Dated Aug. 12, 2004.

(Continued)

*Primary Examiner*—Daniel L Robinson
(74) *Attorney, Agent, or Firm*—George A. Herbster

(57) ABSTRACT

This invention provides a brewing head unit of a coffee machine for easily inserting or removing the filter (15) and locking the filter and the filter holder (17) into the brewing head of a coffee machine to form a water-and pressure tight connection. The filter and the filter holder can be inserted into the coffee machine of the present invention visually. This invention also provides a cabinet filter holder which can be inserted or placed into the brewing head assembly or unit of a coffee machine by sliding the filter holder into the brewing head unit from the front, to or side or by swinging the filter holder, which is movable attached to the brewing head assembly or unit on a pivot, into the coffee machine. This invention further provides a brewing head assembly or unit, wherein the locking mechanism (13, 20) for placing or orienting the filter holder and securing the filter holder to the brewing head assembly or unit is motor-driven. This invention further provides a cabinet filter design wherein the boiler (19) or heating system is separated from the brewing head assembly or unit.

30 Claims, 16 Drawing Sheets

U.S. PATENT DOCUMENTS

| | | | |
|---|---|---|---|
| 3,470,812 | A | 10/1969 | Levinson |
| 4,254,694 | A | 3/1981 | Ily |
| 4,429,623 | A | 2/1984 | Ily |
| 4,741,260 | A | 5/1988 | Bolivar |
| 4,882,982 | A | 11/1989 | Muttoni |
| 5,103,716 | A | 4/1992 | Mikkelsen |
| 5,111,740 | A | 5/1992 | Klein |
| 5,197,374 | A | 3/1993 | Fond |
| 5,388,502 | A | 2/1995 | Hufnagl |
| 5,526,733 | A | 6/1996 | Klawuhn |
| 5,531,152 | A | 7/1996 | Gardosi |
| 5,622,099 | A | 4/1997 | Frei |
| 5,638,741 | A | 6/1997 | Cisaria |
| 5,649,472 | A | 7/1997 | Fond et al. |
| 5,794,519 | A | 8/1998 | Fischer |
| 5,913,962 | A | 6/1999 | Gasser et al. |
| 5,921,168 | A | 7/1999 | Nello |
| 5,992,298 | A | 11/1999 | Illy et al. |
| 6,009,792 | A | 1/2000 | Kraan |
| 6,021,705 | A | 2/2000 | Dijs |
| 6,119,582 | A | 9/2000 | Allerman-Theunisse |
| 6,161,469 | A | 12/2000 | Rolla |
| 6,345,570 | B1 | 2/2002 | Santi |
| 6,412,394 | B2 | 7/2002 | Bonanno |
| 6,481,338 | B1 | 11/2002 | Wai et al. |
| 6,490,966 | B2 | 12/2002 | Mariller et al. |
| 6,510,783 | B1 | 1/2003 | Basile et al. |
| 6,655,260 | B2 | 12/2003 | Lazaris |
| 6,698,332 | B2 | 3/2004 | Kollep et al. |
| 6,748,850 | B1 | 6/2004 | Kraan |
| 6,799,503 | B2 | 10/2004 | Kollep |
| 6,935,222 | B2 | 8/2005 | Chen et al. |
| 7,237,475 | B2 * | 7/2007 | Chen et al. ............... 99/302 R |
| 2002/0022070 | A1 | 2/2002 | Dijs |
| 2002/0148356 | A1 | 10/2002 | Lazaris et al. |

FOREIGN PATENT DOCUMENTS

| | | |
|---|---|---|
| AU | 2004308478 | 6/2006 |
| BR | PI0417942-0 | 6/2006 |
| CA | 2473188 | 7/2004 |
| CA | 2541851 | 5/2006 |
| CH | 337633 | 4/1959 |
| CN | 200480041525.4 | 8/2006 |
| CN | 200410063485.5 | 7/2007 |
| DE | 19647039 A | 7/1997 |
| DE | 10247573 A | 4/2004 |
| EP | 0555775 A1 | 8/1993 |
| EP | 0838185 A1 | 4/1998 |
| EP | 1016364 A2 | 12/1999 |
| EP | 1000574 | 5/2000 |
| EP | 1169956 | 1/2002 |
| EP | 1495703 A1 | 1/2005 |
| EP | 1547498 | 6/2005 |
| EP | 1703826 | 9/2006 |
| GB | 811979 | 4/1959 |
| HK | 05101497.1 | 2/2005 |
| HK | 05105612.2 | 7/2005 |
| HK | 07100546.2 | 1/2007 |
| JP | 2004-201605 | 7/2004 |
| JP | 2006-547403 | 6/2006 |
| KR | 10-2006-7014484 | 7/2006 |
| WO | WO/01/15582 | 3/2001 |
| WO | WO/02/19876 | 3/2002 |
| WO | WO 02/091889 A2 | 11/2002 |
| WO | WO 03/055366 A2 | 7/2003 |
| WO | WO/2004/028318 | 4/2004 |
| WO | WO/2005/063092 | 7/2005 |

OTHER PUBLICATIONS

European Search Report for Electrical & Electronics Limited, European Application No. 03029686.7, Filed Dec. 23, 2003, Dated Jun. 9, 2004.

International Search Report for Electrical & Electronics Limited, International Publication No. WO 05/063092, published Jul. 21, 2005, Dated Jun. 23, 2006.

Written Opinion of the International Searching Authority for Electrical & Electronics Limited, International Publication No. WO 05/063092, published Jul. 21, 2005, Dated Jun. 23, 2006.

European Patent Office Communication for Electrical & Electronics Limited, European Application No. 03029686.7, Filed Dec. 23, 2003, Dated Nov. 9, 2005.

U.S. Appl. No. 11/325,806, filed Jan. 5, 2006, Chen et al.

U.S. Appl. No. 11/105,073, filed Apr. 13, 2005, Chen et al.

European Patent Office Communication for Electrical & Electronics Limited, European Application No. 04016069.9, Filed Jul. 8, 2004 Dated Nov. 8, 2007.

European Patent Office Communication for Electrical & Electronics Limited, European Application No. 03029686.7, Filed Dec. 23, 2003, dated Nov. 24, 2006.

International Search Report for Electrical and Electronics limited, PCT Application No. PCT/US2004/43422, Filed Dec. 23, 2004, Dated May 19, 2005.

Written Opinion of the International Searching Authority for Electrical and electronic Limited, PCT Application No. PCT/US2004/43422, Filed Dec. 23, 2004, Dated May 19, 2005.

PCT International Preliminary Report on Patentability for Electrical and Electronics Limited, International Publication No. WO 05/063092, published Jul. 21, 2005, Dated Oct. 31, 2005.

U.S. Office Action for Chen et. al., U.S. Appl. No. 10/616,417, now Patent No. 6,935,222, filed Jul. 9, 2003, Dated Apr. 9, 2004.

U.S. Office for Chen et. al., U.S. Appl. No. 10/616,417 now Patent No. 6,935,222, filed 9, 2003, Dated Jul. 30, 2004.

U.S. Final Office Action for Chen et. al., U.S. Appl. No. 10/616,417, now Patent No. 6.935,222, filed Jul. 9, 2003, Dated Oct. 1, 2004.

U.S. Supplemental Notice of Allowance for Chen et. al., U.S. Appl. No. 10/616,417, now Patent No. 6,935,222, filed Jul. 9, 2003, Dated Feb. 3, 2005.

U.S. Supplemental Notice of Allowance for Chen et. al., U.S. Appl. No. 10/616,417, now Patent No. 6,935,222, filed Jul. 9, 2003, Dated Jun. 23, 2005.

U.S. Office Action for Chen et. al., U.S. Appl. No. 11/105,073, filed Apr. 13, 2005, Dated Mar. 26, 2008.

U.S. Office Action for Chen et al., U.S. Appl. No. 10/745,440, now Patent No. 7,237,475, filed Dec. 23, 2003, Dated May 19, 2005.

U.S. Office Action for Chen et al., U.S. Appl. No. 10/745,440, now Patent No. 7,237,475, filed Dec. 23, 2003, Dated Sep. 30, 2005.

U.S. Office Action for Chen et al., U.S. Appl. No. 10/745,440, now Patent No. 7,237,475, filed Dec. 23, 2003, Dated Feb. 6, 2006.

U.S. Final Office Action for Chen et al., U.S. Appl. No. 10/745,440, now Patent No. 7,237,475, filed Dec. 23, 2003, Dated Jun. 13, 2006.

U.S. Advisory Action for Chen et al., U.S. Appl. No. 10/745,440, now Patent No. 7,237,475, filed Dec. 23, 2003, Dated Aug. 18, 2006.

U.S. Advisory Action for Chen et al., U.S. Appl. No. 10/745,440, now Patent No. 7,237,475, filed Dec. 23, 2003, Dated Sep. 22, 2006.

U.S. Notice of Allowance for Chen et al., U.S. Appl. No. 10/745,440, now Patent No. 7,237,475, filed Dec. 23, 2003, Dated Mar. 21, 2007.

U.S. Supplemental Notice of Allowance for Chen et al., U.S. Appl. No. 10/745,440, now Patent No. 7,237,475, filed Dec. 23, 2003, Dated May 11, 2007.

* cited by examiner

Figure 1
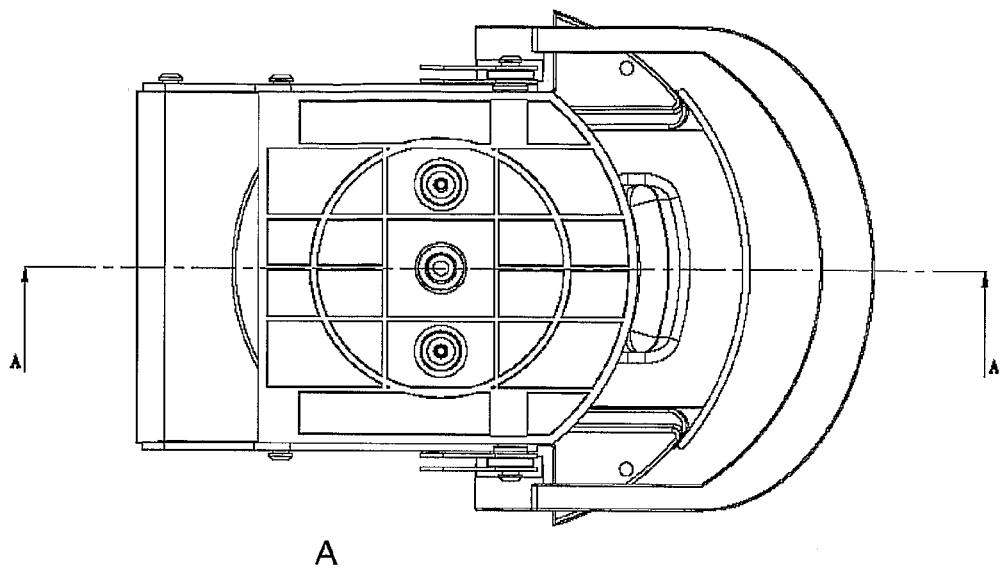
A
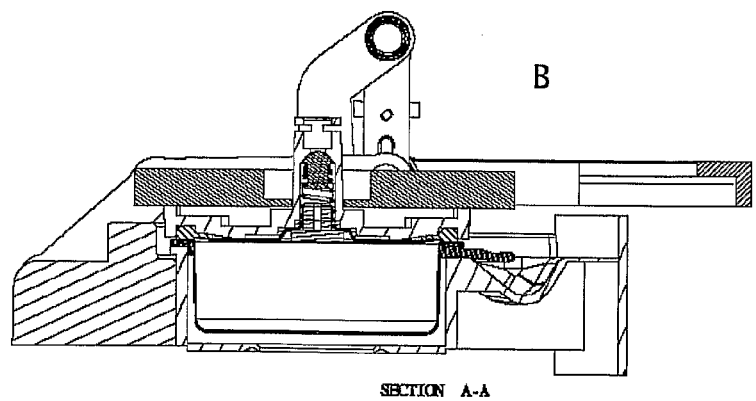
B
SECTION A-A

Figure 4
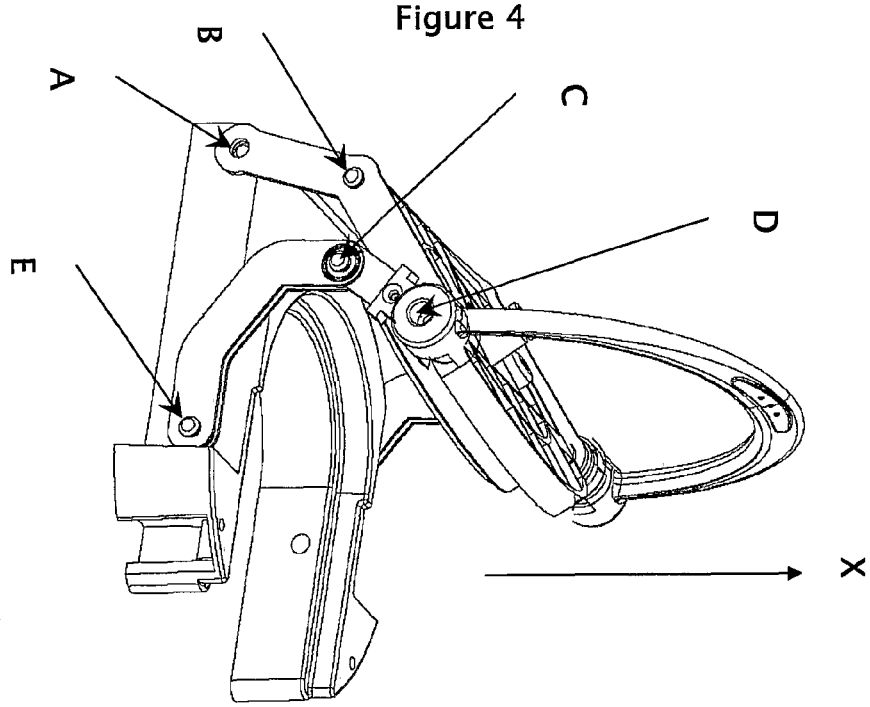
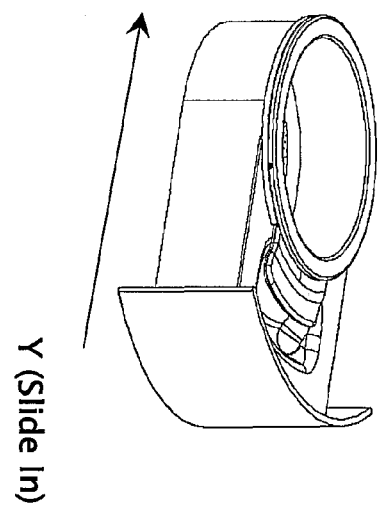

Figure 6
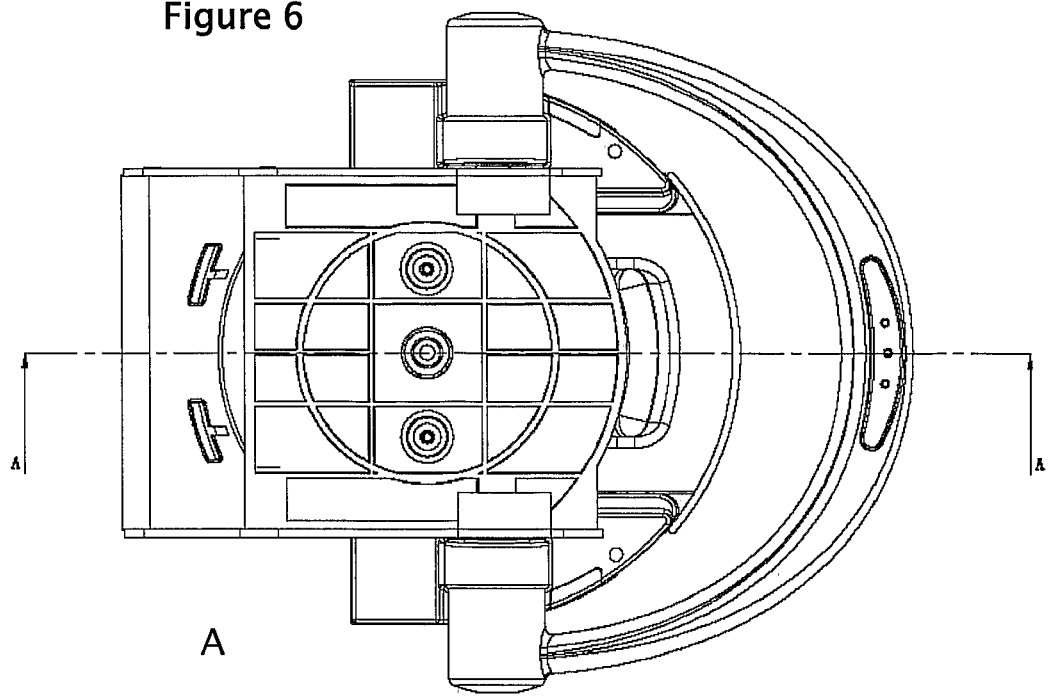
A
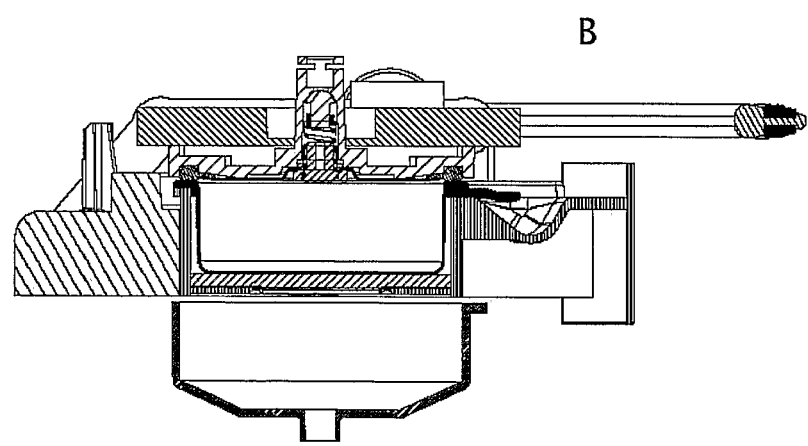
B
SECTION A-A

Figure 7
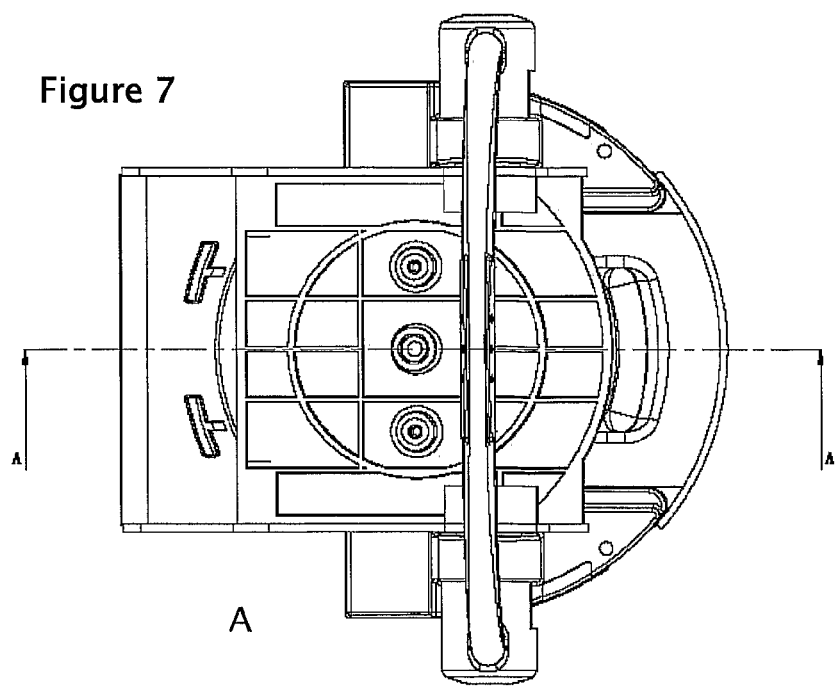
A
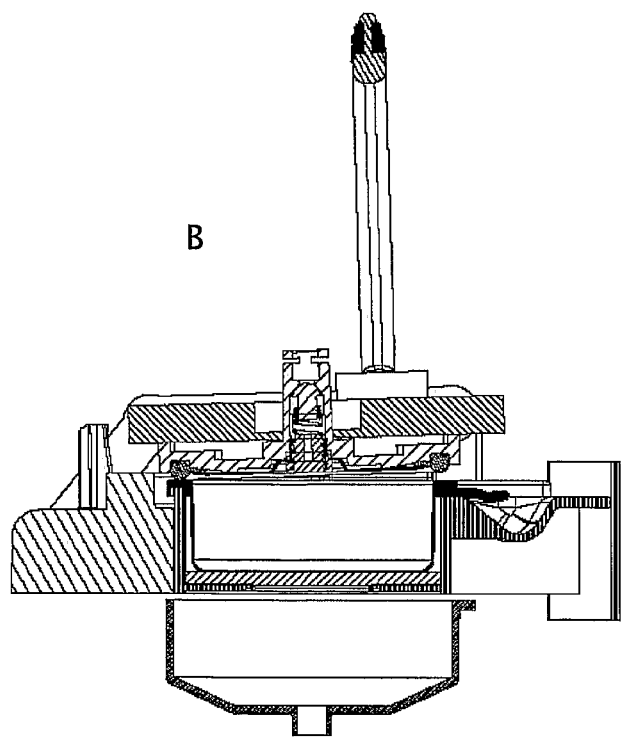
B

Figure 11
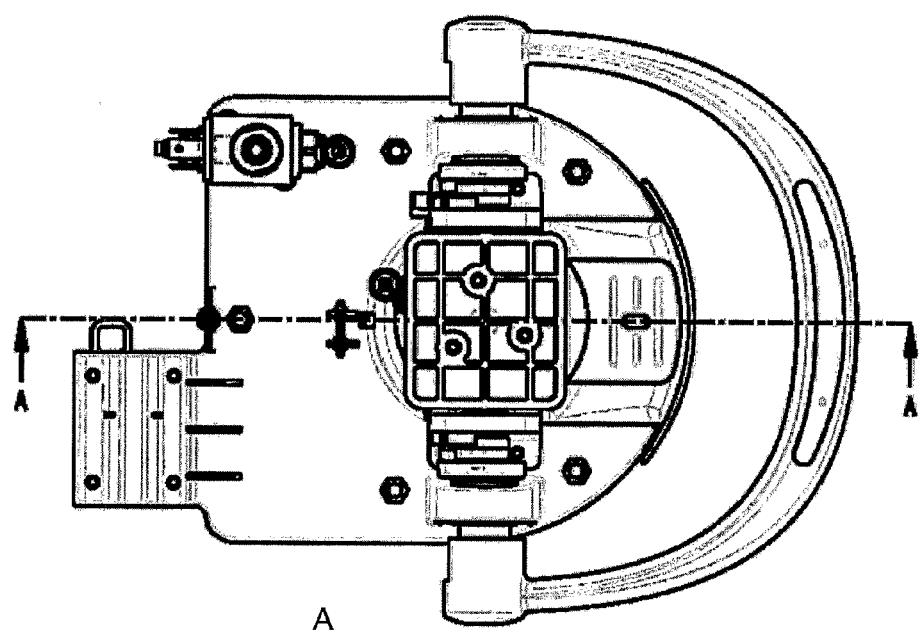
A
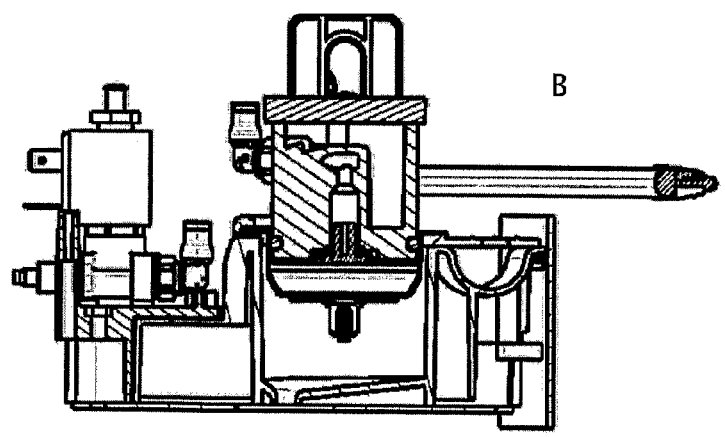
B

SECTION X-X

CABINET DESIGN OF FILTER HOLDER FOR PRESSURIZED ESPRESSO MACHINES

This invention claims priority of U.S. Ser. No. 10/745,440, Filed Dec. 23, 2003 and European Patent Application No. 03029686.7, Filed Dec. 23, 2003, the contents of which are incorporated herein in their entireties by reference into this application.

Throughout this application, various publications are referenced. Disclosures of these publications in their entireties are hereby incorporated by reference into this application to more fully describe the state of the art to which this invention pertains.

FIELD OF THE INVENTION

The present invention relates to the design of a brewing head unit of a coffee machine comprising locking means for detachable attachment of a cabinet- or drawer-like filter holder to the brewing head unit of the coffee machine.

BACKGROUND OF THE INVENTION

The locking mechanisms employed or used by most existing pump espresso or steam espresso machines are not very user friendly. It is very cumbersome for the user to locate and to attach the filter holder unit onto the locking mechanism on the brewing head unit of a coffee machine effortlessly. As a general trend, the filter holder units which have so far been in common use for espresso machines have a brewing tray which is provided with a radially projecting handle and has inserted into a pot-shaped filter insert. For example, see U.S. Pat. No. 5,913,962. With such design, the user would need to put the coffee ground into the stainless steel filter then place or insert the filter into the filter holder. Next, the user would need to find the fitting slot(s) on the brewing head unit, attach the filter unit to the brewing head unit, and turn the filter unit to lock the filter unit onto the brewing head unit. Frequently, the user spends a lot of time attempting to locate the locking position on the brewing head unit.

Moreover, a traditional pump espresso or steam espresso machines use either a boiler or a thermal block heating system which is mounted on top of the brewing head or shower and locking mechanism. With this design, the hot water from the heating system would flow directly to the filter.

The drawbacks relating to mounting the boiler or the thermal block heating system on or above the brewing head unit include design limitations on placement of the locking mechanism. Other limitations or drawbacks of placing the heating system on top of the brewing head unit include:

1. The weight of the heating system on the top will increase the force required to open the brewing head, which is not user friendly.
2. When the heating system is fixed on top of the brewing head unit, it creates a constraint on the design of the locking mechanism. In the present invention, the filter holder (movable part) is placed on the bottom or is separated from the brewing head assembly or unit. Also, in the present invention, the movable part of the locking assembly is on the top and the fixed part is located on the bottom, so the user can slide in or swing-in the filter holder unit into the brewing head unit visually.

The present invention relates to a simpler mechanism for locking the filter holder comprising pivotable upper brewing head section and a lower brewing head section fixedly attached to the brewing head assembly or unit. The said lower brewing head section comprises a housing which can be adapted to receive various types filter holders and/or capsules.

The present invention further relates to the design of a brewing head unit of a coffee machine which has a cabinet filter holder and a boiler or heating system which is not placed on the top of the brew head unit. Another aspect of the invention, the boiler or the heating system as described above is separated from the brewing head unit. In a further aspect of the invention, the boiler or the heating system can be placed side by side with the brewing head locking mechanism.

The boiler and brew head of the invention are operatively connected by Teflon or other suitable hose. The primary advantage of having a boiler or heating system which is separate from the brewing heat unit is that the brew head unit does not have to carry the weight of the boiler so that the design of the locking mechanism is more flexible, versatile and/or dynamic.

Essegielle S.r.1, et al., European Patent Application No. 97118294.4, Filed Oct. 21, 1997 relates to a device wherein the coffee pan is attached to a boiler located above the coffee pan by inserting the coffee pan along a sliding guide and rotating the coffee pan. However, the Essegielle, et al. device still requires the boiler to be place on top of the brew head. Essegielle, et al discloses a two step process for placing or inserting and locking the coffee pan. Essegielle, et al further discloses a coffee pan which slides into the annular body and a handle which is turned with the annular body to lock the coffee pan to the boiler. The present invention only requires the detachable cabinet filter holder to be placed in the coffee machine. A handle is rotated downward to lock the brewing head to form a water- and pressure-tight seal. Moreover, in the present invention, the boiler is not placed on the top of the brew head.

It is another object of the present invention to take away from the user all the hassles of inserting the filter holder into the brewing head unit. The present invention relates to a new design which uses easy to fit cabinet design to act as the filter holder. The user has a very simple task to perform, namely to fit the filter into the filter holder visually. There is no longer any need for the user to search blindly for the locking position. This cabinet design concept can be applied to all types of pressurized espresso machines. There are at least 5 ways to place the cabinets into the machines and they can be performed as follows:

1. Slide the cabinet filter holder into the brewing head unit from the front;
2. Slide the cabinet filter holder into the brewing head unit from the sides;
3. Slide the cabinet filter holder into the brewing head unit from the rear;
4. Swing the cabinet filter holder in or out about a pivot fixed to the brewing head unit; or
5. Insert the cabinet filter holder into the brewing head unit from the top.

In another aspect of the invention, a motor is used to operate the locking mechanism and/or the cabinet filter holder without any manual intervention so that the entire movement of the cabinet filter holder unit or the locking or the opening of the brewing head assembly or unit would require less effort and, thus, more convenient for the user. In a further aspect of the invention, the movement of the cabinet and/or the locking mechanism is provided by a motor which is operated by a remote control.

Table 1 below summarizes the key differences between the filter holder mechanism according to the existing state of the art and claimed cabinet filter holder of the present invention.

TABLE 1

DIFFERENCES BETWEEN THE FILTER HOLDER MECHANISM ACCORDING TO THE EXISTING STATE OF THE ART AND THE CLAIMED CABINET FILTER HOLDER

| | Existing Pressurized Filter Holder Mechanism | Cabinet Filter Holder Mechanism Of The Present Invention |
|---|---|---|
| Boiler or thermal block | It needs to be on top of the brew head and above the filter holder. | The boiler or thermal block does not have to be on the top of the brew head. It can even be separated from the brewing head assembly or unit or placed side by side with the locking mechanism. |
| Filter holder fitting | The user would need to fumble to locate it and then would need to lock the holder in place by turning it from left to right or right to left. | The new cabinet can be slide in from the front, side or rear, or swing out, or inserted from the top. The movement of the cabinet can be automated by a motor to drive/control the movement. The said motor can be operated by remote control. |
| Where to place the filter holder | Involves fumbling by the user. | Direct/immediately visible |
| Locking method | Lock by swing fit of the filter holder. | Rotate to Lock system |

Fond et al., U.S. Pat. No. 5,649,472, relates to a system for extracting a substance contained in a sachet, which includes a lower member containing the sachet housing, a water supply member and a locking lever. The lower member and the water supply member are closed or locked by engaging the hooks on the arm of the locking lever on the corresponding rods. The main purpose of the Fond et al is to provide a method and device for extracting substances for the preparation of a beverage contained in a sealing flexible sachet without opening the sachet before placing it in the sachet holder. The present invention can use or brew coffee grounds contained within a sachet or coffee grounds without a sachet having a pre-determined shape. The lower member of the Fond et al device is fixed, whereas the present invention has an upper member, i.e., rotate to lock assembly, which can move upward to allow a lower member, i.e., the filter holder assembly to be retrieved.

Mariller, et al., U.S. Pat. No. 6,490,966, relates to a device for extracting the contents in a capsule consisting of two independent and identical clamping elements, where each clamping element contains half of a housing for the capsule, and a lever system for moving both clamping elements simultaneous between open and closed positions. The Mariller device places a capsule in vertical position and therefore requires the clamping members to produce greater clamp force to form a water-tight seal. In contrast, the brewing head of the present invention can use a coffee pod or capsule placed in the horizontal position. The brewing head of the present invention does not require two clamping members. To form a pressure- and water-tight seal, a movable upper member is lowered against the detachable stationery filter holder assembly.

Kollep et al., U.S. Pat. No. 6,698,332, relates to a device for extracting a substance for the preparation of a drink, which includes a fixed piece and a second piece movable relative to the first piece about an axis of rotation lying at the rear to two pieces. The front-end of the two pieces contain a cavity for the substance to be extracted, and the device also includes a system for opening and closing the two pieces. However, the lower part of the Kollep et al device is fixed and cannot be removed for cleaning.

Domel SA/AG et al., European Patent Application No. 93101764, filed Feb. 5, 1993, relates to a drawer device containing a container/filter holder. The container/filter holder can be raised upward with a handle in a non-rotating way against a facing gasket fixed above the drawer device to form a water-tight seal. The drawer in Domel et al is locked by rotating the control body. The movement of the container-filter holder is vertical but the vertical movement requires the rotation of the control body. In contrast, the brewing head of the present invention only moves the upper member, i.e., the rotate to lock assembly. The lower member, i.e., the support base, of the brewing head of the present invention is fixed, but the filter holder assembly containing the filter can be removed completely for cleaning. Furthermore, the Domel et al device is only designed for coffee bags. The present invention is designed to use both ground coffee and coffee bag.

Torriani, U.S. Pat. No. 1,750,068, relates to a device containing a circular filter-carrier adapted to slide in and out of a window. The filter-carrier is locked by rotating a collector below the filter-carrier to force the filter-carrier upward against the upper portion of the brew head. The device in Torriani patent has the design of a traditional espresso machine. The filter carrier can slide in and out, but to lock the filter carrier still requires blindly turning the tread on the collector.

Hatz, U.S. Pat. No. 811,979, relates to a device for preparing coffee, which includes a pressure cooker for forcing heated water to the coffee percolator by stream pressure. The Hatz device uses a different method to prepare the coffee. Hatz uses a pressure cooker instead of a boiler system. Hatz also uses a preculator instead of the filter holder. The pressure cooker requires a stove or heating device to heat up the water. The coffee machine of the present invention uses electricity to bring the water to boil.

The foregoing objects and advantages of the present invention are illustrative of those that can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omission may be made in the following summary, which is intended to highlight and introduce some aspects of the present invention, but not to limit its scope. Detailed descriptions of a preferred exemplary embodiment adequate to allow those of ordinary skill in the art to make and use the invention concepts will follow in later sections.

According to an aspect of the invention, the design and uses of a cabinet filter holder for the brewing head assembly or unit of a coffee machine is disclosed.

According to another aspect of the invention, the boiler or heating system is separated from the brewing head assembly or unit.

According to another aspect of the invention, the filter holder assembly or unit can be inserted into the brewing head assembly or unit by sliding the filter holder unit or assembly from the front or side, swing the filter holder assembly or unit in or out of the brewing head unit on a pivot, and inserting the filter holder assembly or unit vertically from the top.

According to another aspect of the invention, the design of the locking mechanisms for locking the cabinet filter holder assembly or unit in the brewing head assembly or unit is disclosed.

According to another aspect of the invention, the design of the locking mechanism capable of locking the filter holder assembly or unit in the brewing head assembly and capable of sustaining, advantageously at least 5 bars of pressure is disclosed.

According to another aspect of the invention, the design of the locking mechanism capable of locking the filter holder assembly or unit in the brewing head assembly and capable of sustaining, advantageously at least 10 bars of pressure is disclosed.

According to another aspect of the invention, the design of the locking mechanism capable of locking the filter holder assembly or unit in the brewing head assembly and capable of sustaining, advantageously at least 15 bars of pressure is disclosed.

According to another aspect of the invention, the design of the locking mechanism capable of locking the filter holder assembly or unit in the brewing head assembly and capable of sustaining, advantageously at least 20 bars of pressure is disclosed.

According to another aspect of the invention, the locking mechanism of the invention is motor-driven and/or operated by the use of remote control.

Although the present invention has been described in detail with particular reference to preferred embodiments thereof, it should be understood that the invention is capable of other different embodiments, and its details are capable of modifications in various obvious aspects. As is readily apparent to those skilled in the art, variations and modifications can be affected while remaining within the spirit and scope of the invention. Accordingly, the foregoing disclosure, description, and figures are for illustrative purpose only, and do not in any way limit the invention which is defined only by the claims.

DETAILED DESCRIPTION OF THE FIGURES

The invention relates to a sliding cabinet filter holder and a 2 to 15 bar locking mechanism.

The accompanying drawing illustrates diagrammatically non-limitative embodiment of the invention as follows:

One embodiment of this invention, hereinafter referred to as Construction I, is shown in FIG. 1 to FIG. 5.

FIG. 1 is a cross-sectional illustration of the brewing head assembly or unit of Construction I in the closed position. A: Top view. B: Side view.

FIG. 4 is isometric view of the brewing head assembly or unit of Construction I in the opened position.

Another embodiment of this invention, hereinafter referred to as Construction II, is shown in FIG. 6 to FIG. 10.

FIG. 6 is a cross-sectional illustration of the brewing head assembly or unit of Construction II in the closed position. A: Top view. B: Side view.

FIG. 7 is a cross-sectional illustration of the brewing head assembly or unit of Construction II in the opened position. A: Top view. B: Side view.

Figure 8:
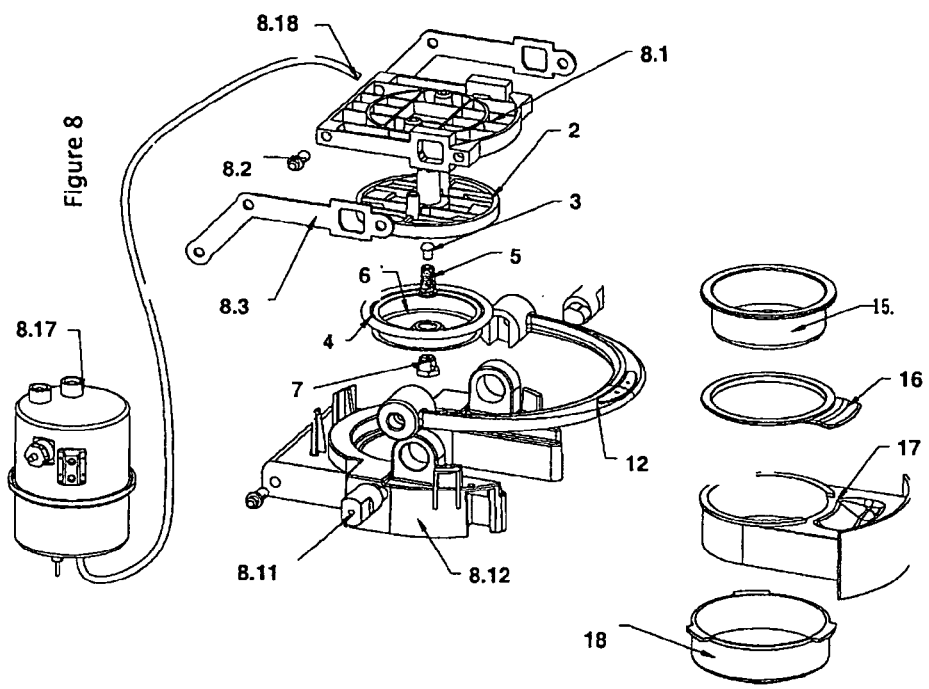

FIG. 8 is an explode view of the brewing head assembly or unit of Construction II, comprising a rotate to lock assembly, a sealing assembly, a slide filter holder assembly, a separated boiler and a hose for delivering pressurized and/or heated water/steam from the boiler to the coffee chamber.

Figure 9:
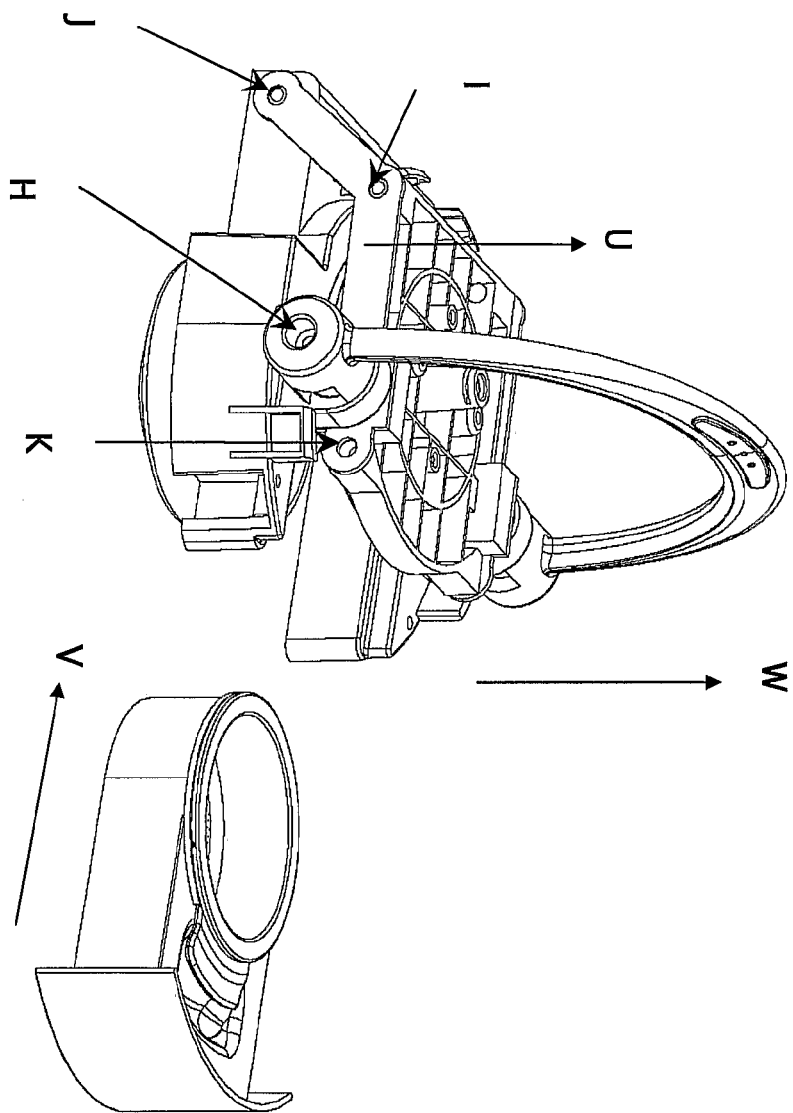

FIG. 9 is isometric view of the brewing head assembly or unit of Construction II in the opened position.

Figure 10:
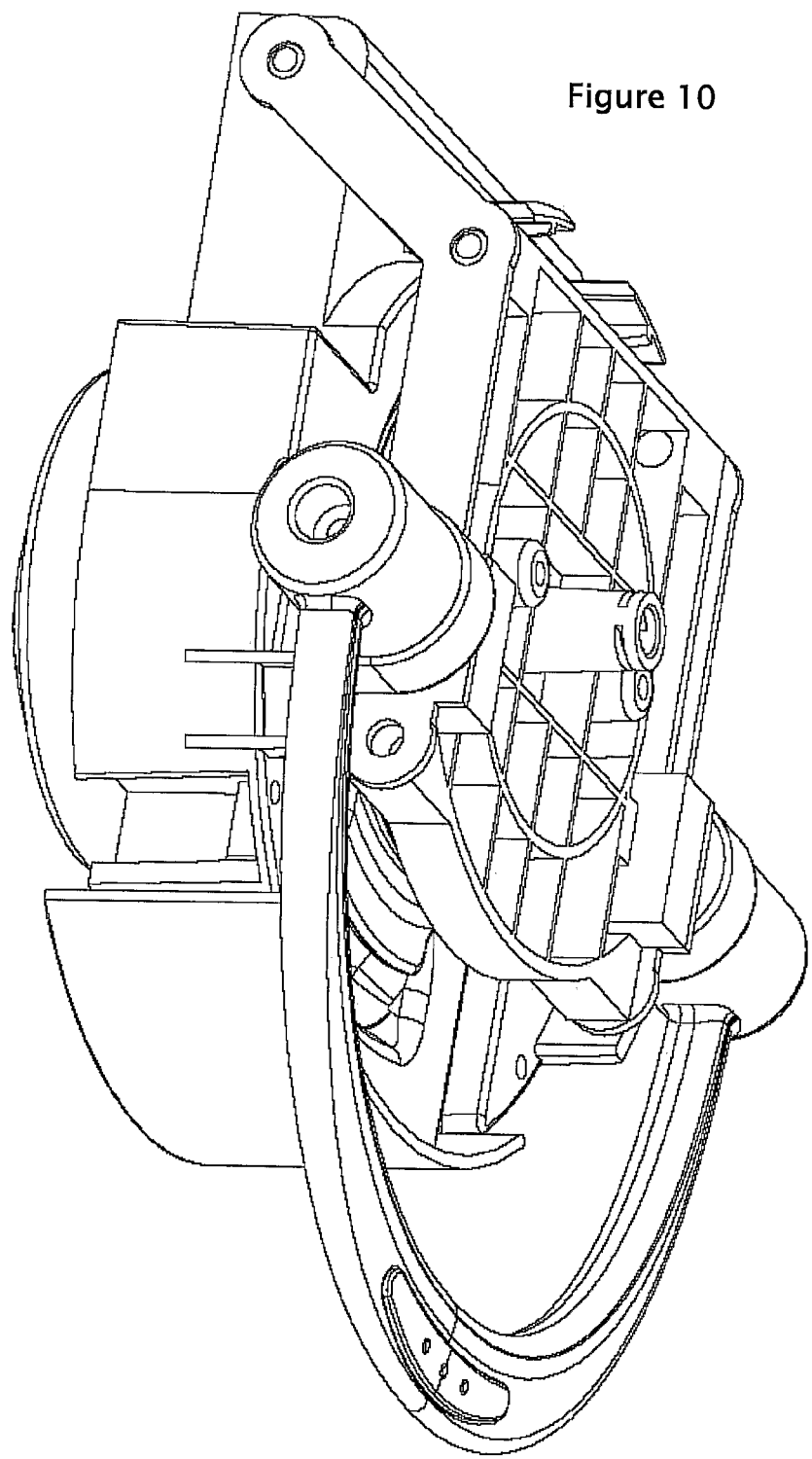

FIG. 10 is isometric view of the brewing head assembly or unit of Construction II in the closed position.

Another embodiment of this invention, hereinafter referred to as Construction III, is shown in FIG. 11 to FIG. 16.

FIG. 11 is a cross-sectional illustration of the brewing head assembly or unit of construction III in the opened position. A: Top View. B: Side View.

Figure 12:
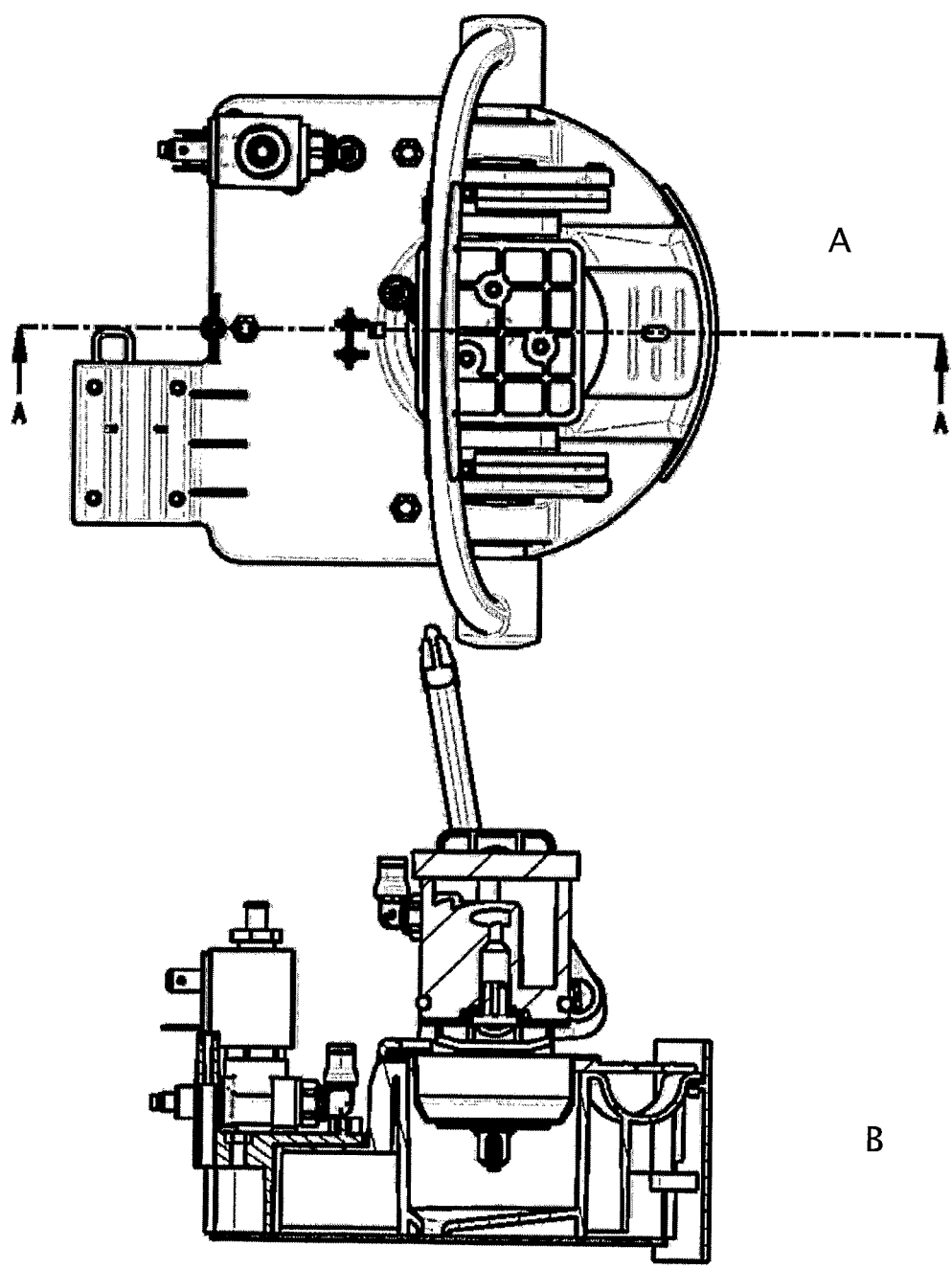

FIG. 12 is a cross-sectional illustration of the brewing head assembly or unit of construction III in the closed position. A: Top View. B: Side View.

Figure 13:
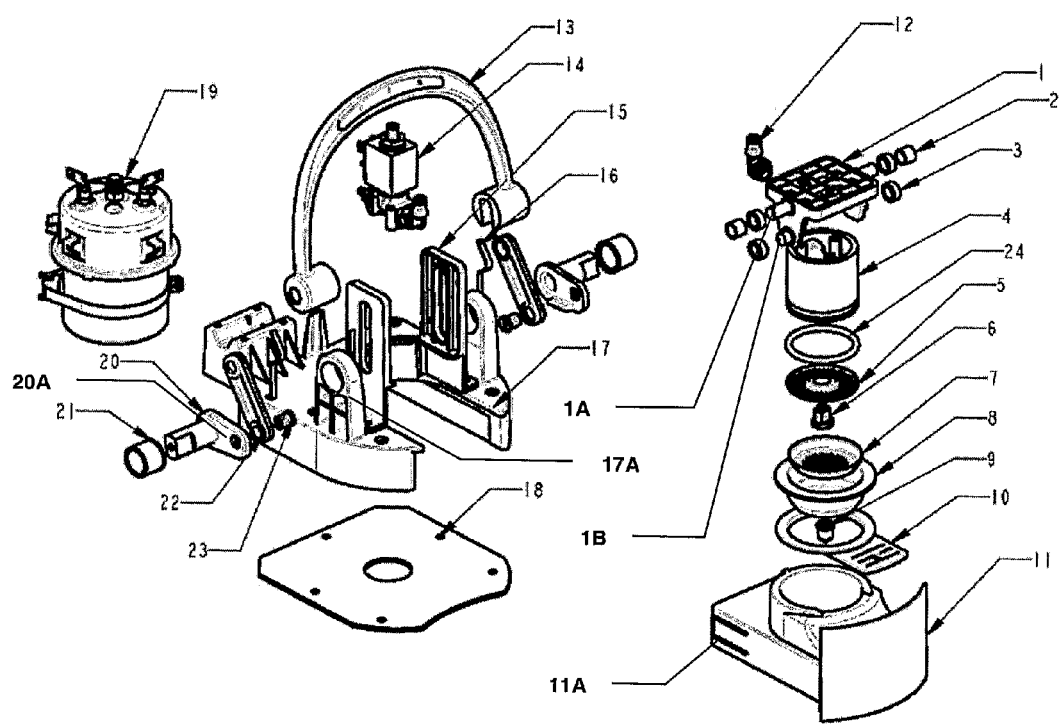

FIG. 13 is a explode view of the brewing head assembly or unit of construction III, comprising a rotate to lock assembly, a sealing assembly, a slide filter holder assembly, a separated boiler and hose for delivering pressurized and/or heater water/steam from the boiler to the coffee chamber.

Figure 14:
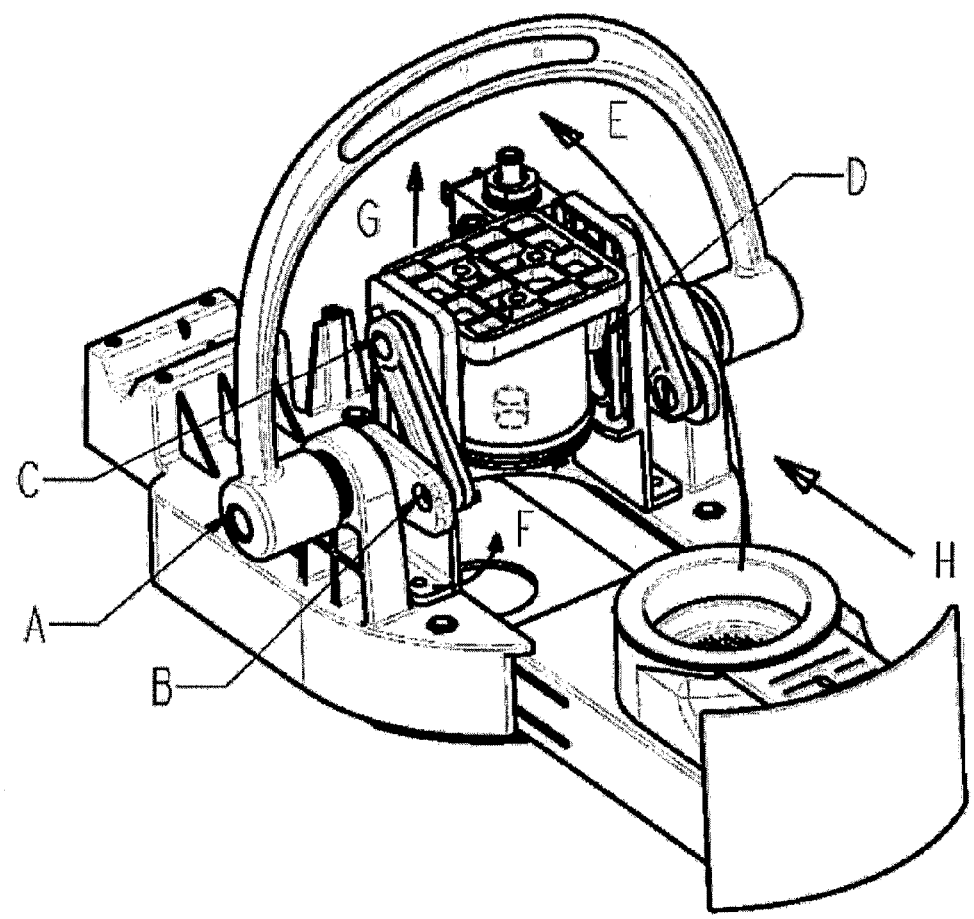

FIG. 14 is isometric view of the brewing head assembly or unit of construction III in an opened position and shower the shown the filter holder slide into the brewing head assembly or unit of construction.

Figure 15:
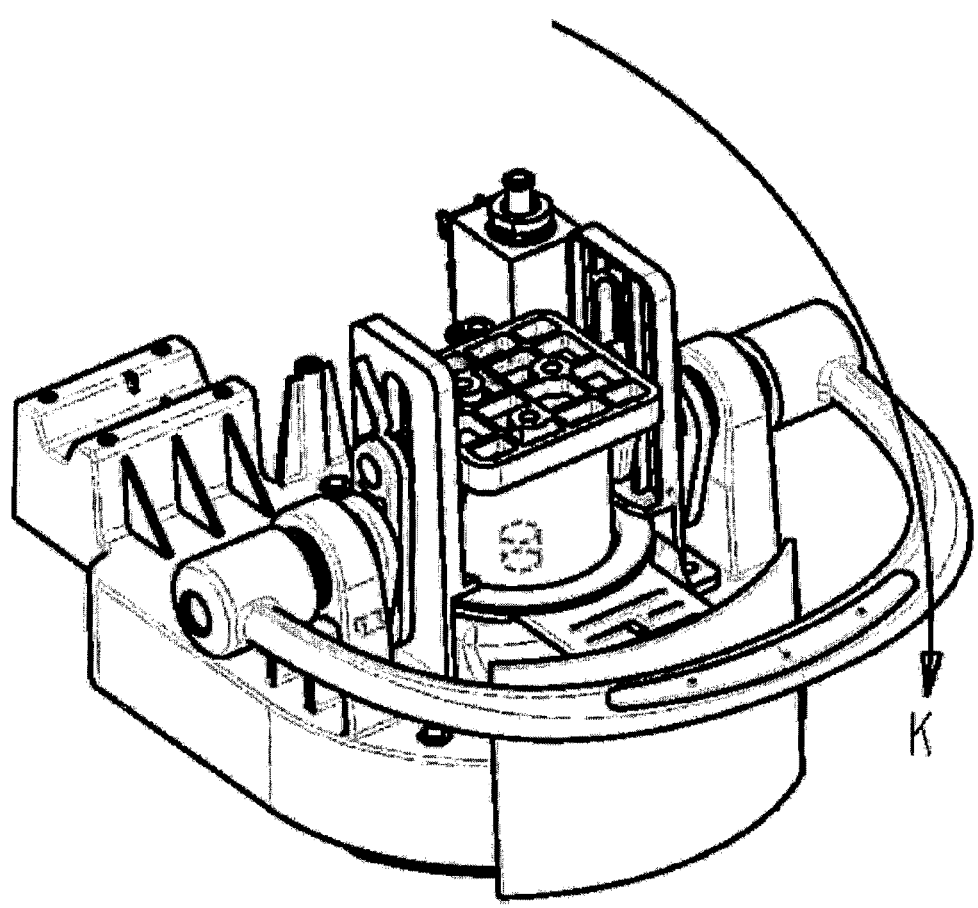

FIG. 15 is isometric view of the brewing head assembly or unit of construction III in the closed position.

Figure 16:
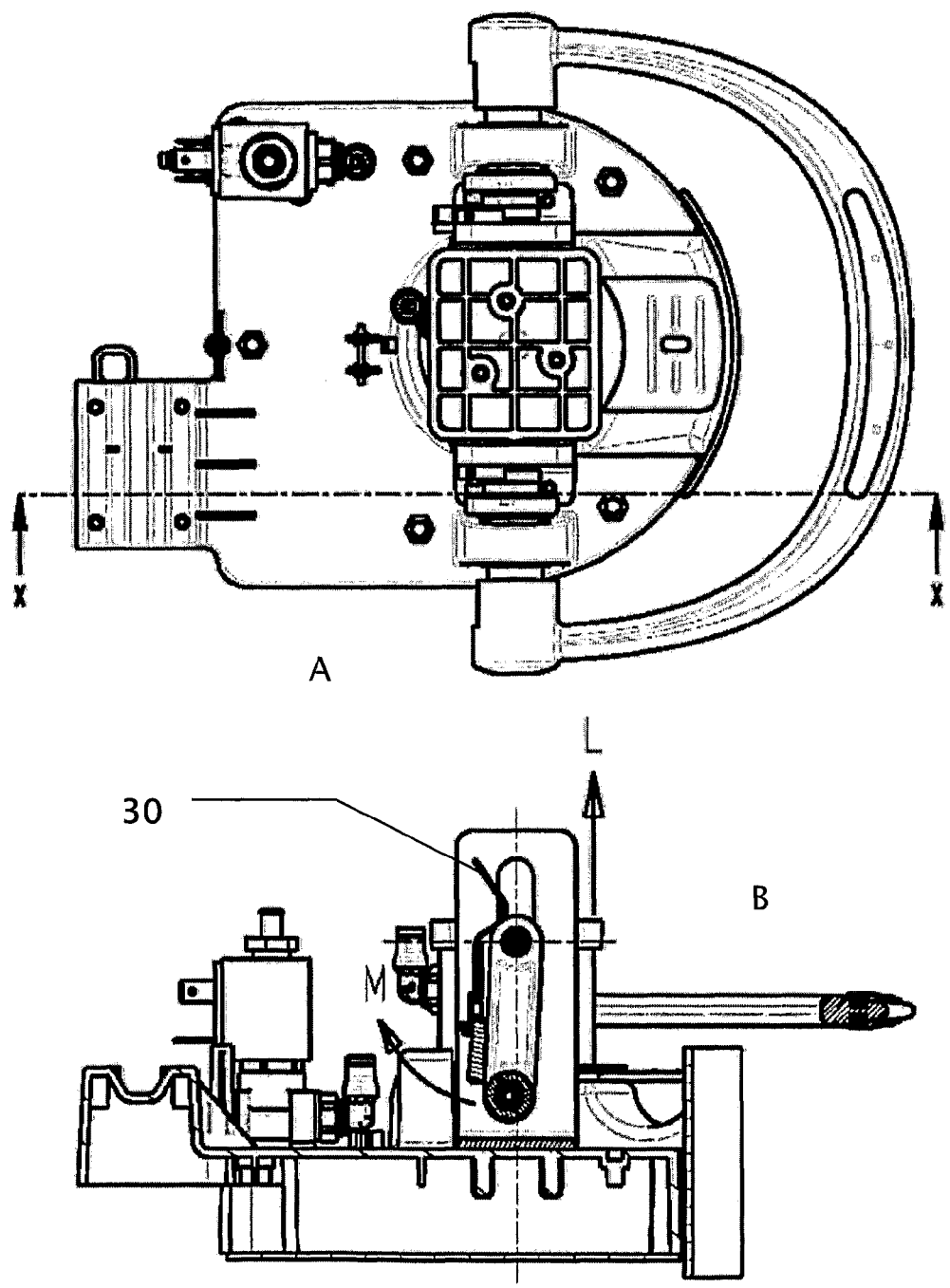

FIG. 16 is a cross-sectional illustration of the brewing assembly or unit of construction III in closed position. The section view will shown the stopper on the rotation pole to make the moving rod stopped on the inter lock position. A: Top View. B: Side View.

DETAILED DESCRIPTION OF THE INVENTION

It is the object of this invention to provide a cabinet design of the filter holder. This invention provides a boiler or heating system which is separate from the brewing head unit of the coffee machine and a locking mechanism.

This invention provides a locking mechanism which is advantageous over prior art in that the filter holder unit does not need to be turned for it to lock. We only need slide in the filter holder and rotate down the handle. It is easier to operate and more efficient than the traditional turning lock mechanism.

I. Rotate to Lock Assembly of Construction I

This invention provides a brewing head assembly or unit (See FIGS. 1-5) of a coffee maker comprising: a rotate to lock assembly, a sealing assembly and a filter holder assembly or unit, operatively linked to sustain pressure of at least 5 bars. In an embodiment, the above-described rotate to lock assembly, sealing assembly, and filter holder assembly or unit are operatively linked and are capable of sustaining advantageously at least 10 bars of pressure. In another embodiment, the above-described rotate to lock assembly, sealing assembly, and filter holder assembly or unit are operatively linked and are capable of sustaining advantageously at least 15 bars of pressure. In a further embodiment, the above-described rotate to lock assembly, sealing assembly, and filter holder assembly or unit are operatively linked and are capable of sustaining advantageously at least 20 bars of pressure.

Figure 2:
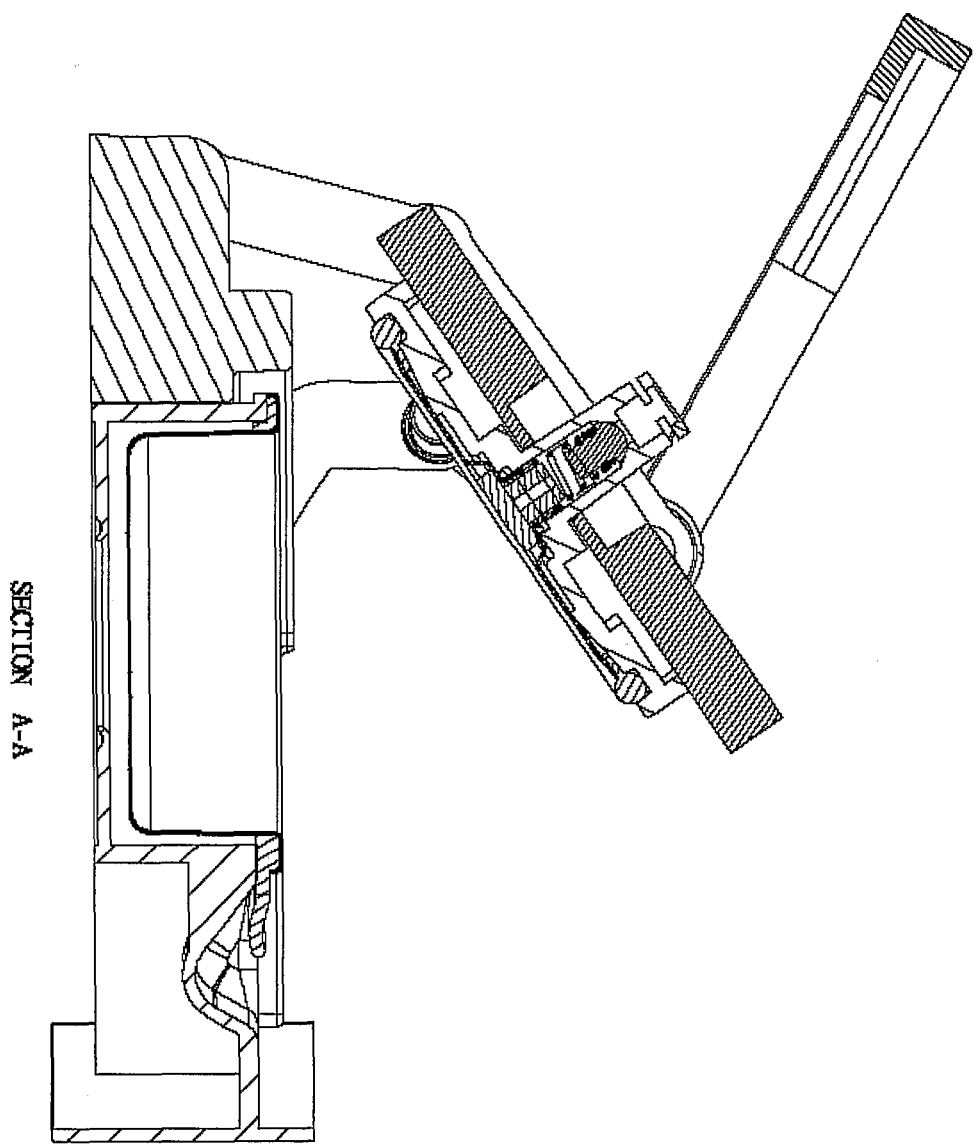
FIG. 2 is a cross-sectional illustration of the brewing head assembly or unit of Construction I in the opened position.
Figure 3:
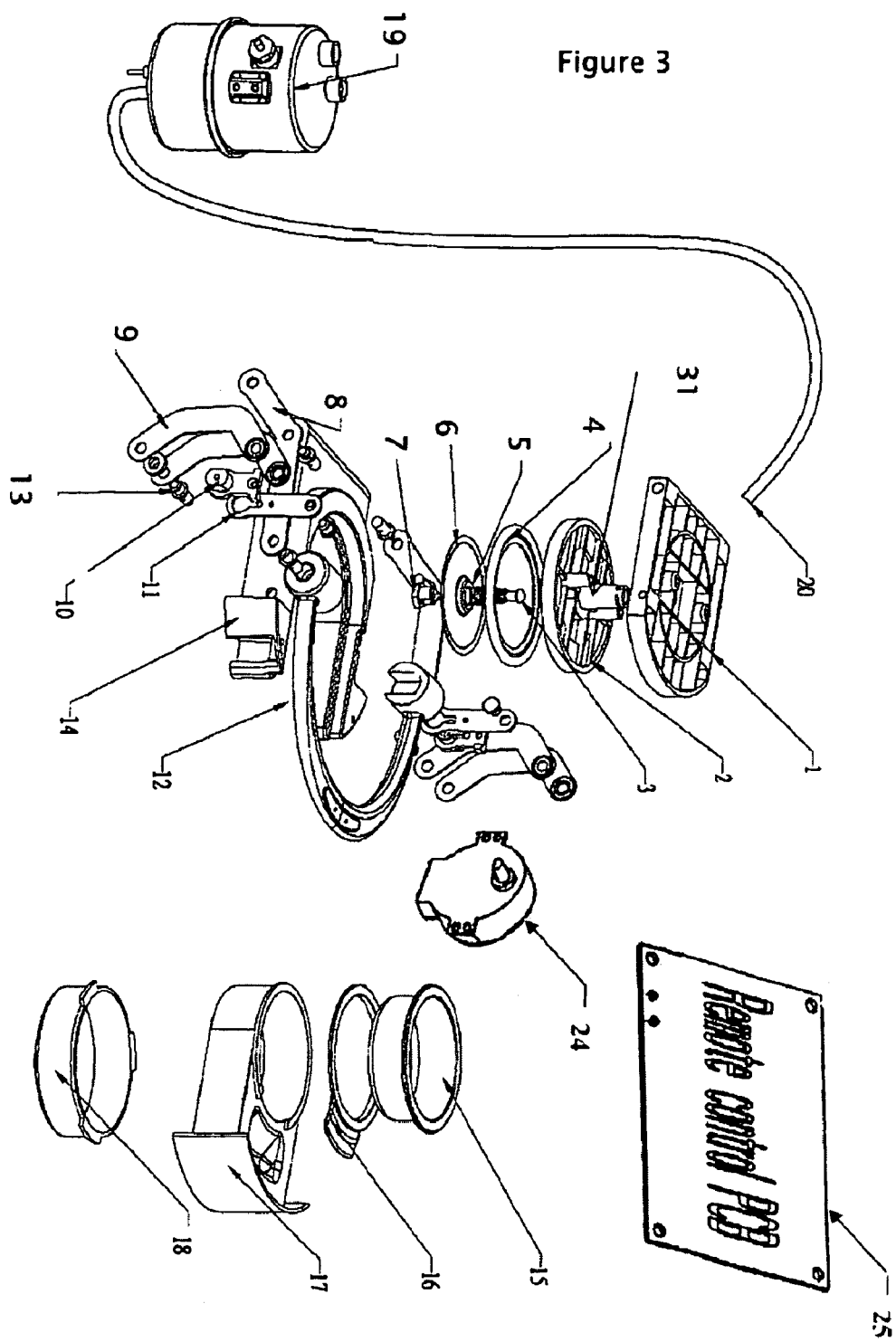
FIG. 3 is an explode view of the brewing head assembly or unit of Construction I, comprising a rotate to lock assembly, a sealing assembly, a slide filter holder assembly, a separated boiler and a hose for delivering pressurized and/or heated water/steam from the boiler to the coffee chamber.
Figure 5:
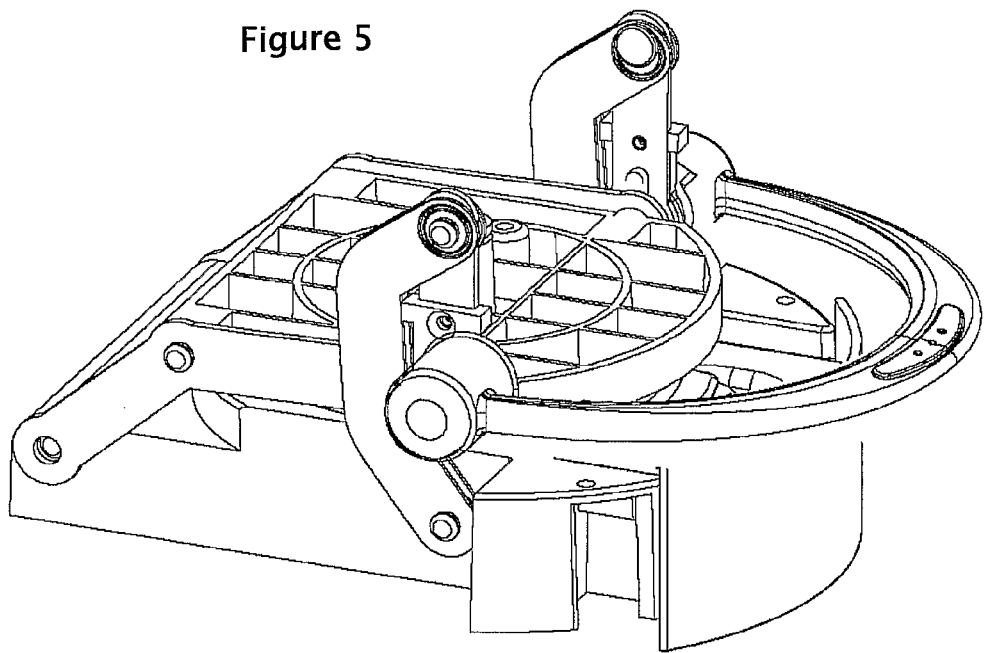
FIG. 5 is isometric view of the brewing head assembly or unit of Construction I in the closed position.

This invention provides a rotate to lock assembly comprising handle 12 movably joined to a rotate plate 11, a rotate rod 10 and a top frame 1 by a fixed pin 13, at a position as indicated by arrow D in FIG. 4. A back connection plate 8 is fixed on one end to the top frame, at the positions as indicated by arrows B and D in FIG. 4, and movably joined to a support base 14 on another end, at a position as indicated by arrow A in FIG. 4. A front connection plate 9 is moveably joined to rotate plate on one end, at a position as indicated by arrow C in FIG. 4, and to the support base 14 on another end, at a position as indicated by arrow E. In an embodiment, the rotate to lock assembly is as shown in FIG. 3.

This invention provides a sealing assembly comprising a seal ring 4, which is inserted between a water connection plate 2 and a water spreader 6. A water outlet valve 3, which contains a water outlet spring 5, is inserted through the center of the water spreader 6, seal ring 4, and the water connection plate 2. The water outlet valve 3, the water outlet spring 5, the seal ring 4, the water spreader 7 are fixedly attached to the water connection plate 2 by a water outlet valve holder 7. The water connection plate is fixedly attached to the top frame. The water connection plate 2 contains an opening 31 for connecting the water connection plate 2 to a hose 20 for delivering heated and/or pressurized fluid from a boiler 19 through the sealing assembly to the brewing chamber. In an embodiment, the sealing assembly is as shown in FIG. 3.

The water outlet valve holder 7 is the nut which holds the water spreader 6, water outlet spring 5, seal ring 4, and the water outlet valve 3 to the water connection plate 2.

This invention provides a filter holder assembly/unit comprising a filter 15, filter handle 16, filter holder 17 and coffee chamber 18.

In an embodiment, the filter holder assembly is as shown in FIG. 3.

The operations of the locking mechanism of an embodiment of the present invention, i.e., Construction I, are as follows:

To prevent the leakage of water, the silicone rubber seal ring is used on the brew head to form a water- and/or pressure-tight connection between the water connection plate 2 and the filter 15. The silicone rubber seal ring 4 is fixed between the water connection plate 2 and water spreader 5 by the water outlet valve holder 7.

To unlock the cabinet filter holder 17, the handle 12 rotates upward in the direction of arrow X, the rotate rod 10 and the rotate plate 11, which are operatively linked, move from the upright position backwards to an inclined position. The opening angle of the brew head is about 45 to 55 degrees. After opening the brewing head assembly or unit, the filter holder can be slide into the support base 14 in the direction of arrow Y, or pulled out of the support base 14.

To close and/or lock the brewing head assembly or unit, the handle is moved downward. The rotate pin, rotate plate 11 and front connection plate 9 moves upright, and the brew head is locked. Once locked, the silicone rubber seal ring 4 sits on the filter 15. The water connection plate 2 in the locked position will make the seal ring 4 deform on the filter 15. This deformation creates a seals to prevent water from leaking from the flange of the filter 15.

The upright position of the rotate plate 11, rotate pin and the front connection plate 9 can sustain at least 20 bars of pressure exerted on the filter 15 so it will not leak when at least 20 bars of pressure is applied. In the closed position, the coffee machine can start to brew coffee.

FIG. 3 shows the exploded view of one aspect, i.e., Construction I, of the invention to show the components of the rotate to lock assembly, sealing assembly and filter holder assembly.

As shown in FIG. 3, the metal handle 12 rotates upward for un-locking the brewing head assembly or unit. The handle is linked to the rotate plate 11, rotate rod 10, front connection plate 9 and the back connection plate 8 by a fix pin 13. All the parts move until the front connection plate is in the horizontal position. The top frame 1 will make an inclination angle of between about 45 to 55 degrees to the support base 14 when the brewing head unit is in the opened position.

The sealing assembly comprises a top frame 1, a water connection plate 2, a seal ring 4, a water outlet valve 3, a water outlet spring 5, a water spreader 6 and a water outlet valve holder 7. The water outlet valve holder 7 is the nut which holds the water spreader 6, water outlet spring 5, seal ring 4, and the water outlet valve 3 to the water connection plate 2. Then the sealing assembly is fixed to the top frame 1 by at least one screw. A water outlet valve 3 and water outlet spring 5 is used to prevent water or fluid from flowing out from the water spreader to the coffee under low pressure during the water heating stage. Hot water is released when the pump pressure is greater than the force being exerted by water outlet spring, which is around at least 5 Bar. When hot water makes contact with the coffee, the pump pressure will increase to at least 10 to 20 bars. Then the coffee will flow out to the cup.

To brew coffee, the filter holder assembly or unit needs to slide into the brewing head unit. The filter holder assembly/unit is comprised of the metal filter 15, filter handle 16, filter holder 17 and coffee chamber 18. The coffee is placed into the coffee filter, and then the filter holder is inserted into the filter holder. The coffee chamber 18 collects the coffee and which then flows to the cup.

II. Rotate to Lock Assembly Construction II

This invention provides a brewing head assembly or unit, i.e., See FIGS. 6-10, of a coffee maker comprising: a rotate to lock assembly, a sealing assembly and filter holder assembly, operatively linked to sustain pressure of at least 5 bars. In an embodiment, the above-described rotate to lock assembly, sealing assembly, and filter holder assembly are operatively linked, and are capable of sustaining advantageously at least 10 bars of pressure. In another embodiment, the above-described rotate to lock assembly, sealing assembly, and filter holder assembly are operatively linked and are capable of sustaining advantageously at least 15 bars of pressure. In a further embodiment, the above-described rotate to lock assembly, sealing assembly, and filter holder assembly are operatively linked and are capable of sustaining advantageously at least 20 bars of pressure.

This invention provides a rotate to lock assembly, comprising a handle, a top frame, a connecting plate, a hinge pin, a cam pin and a support base. In an embodiment, the rotate to lock assembly is as shown in FIG. 8.

This invention provides a sealing assembly, comprising a seal ring, a water connection plate, a water outlet valve, a water outlet spring, a water spreader, and a water outlet valve holder. In an embodiment, the sealing assembly is as shown in FIG. 8.

This invention provides a filter holder assembly or unit, comprising a filter, a filter handle, a filter holder and a coffee chamber. In an embodiment, the filter holder assembly or unit is as shown in FIG. 8.

The operation of the locking mechanism of an embodiment of the present invention, i.e., Construction II, is as follows:

To prevent the leakage of water from the brewing head, a silicone rubber seal ring 7 is used on the brewing head unit. The silicone rubber seal 7 is fixed between a water connection plate 4 and a water spreader 9 by a water outlet valve holder 8. See FIG. 8.

To operate the rotate to lock assembly, a handle 10 is rotated upwards in the direction of arrow W until the handle 10 is 90 degrees with the horizontal. See FIG. 9. A cam pin 11 is linked to the handle 10, at a position as indicated by arrow H in FIG. 9. When the cam pin 11 rotates, it causes the connection plate 3 to rise up in the direction of arrow U. The connection plate 3 is linked to the top frame 1 by two hinge pins 2 on both sides, at the positions as indicated by arrows I and K. The clamp force on the filter holder 16 is released by lifting the connection plate 3 with the cam pin 11 and handle 10. Once the brewing head assembly or unit is in the opened position, the user can insert or slide-in the filter holder assembly or unit in the direction of arrow V, or pull out the filter holder assembly or unit. See FIG. 8.

To brew coffee, the filter holder assembly or unit is inserted into the cabinet filter holder housing located on the support base 12 of the brewing head assembly or unit. Then the handle 10 is rotated downward to the locked or closed position. See FIG. 10. The cam pin 11 will force the connection plate 3 downward. The connection plate 3 and cam pin 11 configuration will create a clamp force capable of maintaining pressure- and/or water-tight seal up to at least 20 bars against the filter holder assembly. The filter holder is sealed by a seal ring 7 and with the clamp force created by the cam pin 11 and the connection plate 3.

FIG. 8 is the exploded view of the brewing head assembly or unit of Construction II showing the components of the rotate to lock assembly, the sealing assembly and the filter holder assembly.

As shown in FIG. 8, the metal handle 10 rotates upward to unlock the brewing head unit. The handle is linked to cam pin 11 and the connection plate 3 by a screw. When the handle moves, the cam pin 11 will rotate. The irregular shape of the cam pin will cause the connection plate 3 to rise up because the connection plate 3 is connected to the top frame 1 by the hinge pin 2 on both sides. The connection plate will also cause the top frame 1 to rise up slightly. The inclination angle between the top frame 1 and the support base 12 is about 10 degrees. This angle is just enough for the filter holder assembly or unit to slide in and out of the brewing head unit. After the filter holder assembly or unit is inserted into the brewing head unit, the handle can be rotated downward to lock the filter holder assembly or unit.

The sealing assembly of the brew head assembly or unit of Construction II is composed of a top frame 1, a water connection plate 4, a seal ring 7, a water outlet valve 5, a water outlet spring 6, a water spreader 9 and a water outlet valve holder 8. The water outlet valve holder 8 is the nut which holds the water spreader 9, water outlet spring 6, seal ring 7, and water outlet valve 5 to the water connection plate 4. The sealing assembly is fixed to the top frame 1 by one or more screw. Water outlet valve 5 and water outlet spring 6 is used to prevent water leakage from the water spreader 9 under low pressure during the water heating stage. Hot water is released when the pump pressure is greater than the force exerted by the water outlet spring 6, which is around 5 Bar. When the hot water makes contact with the coffee, the pump pressure will increase to at least 10 to 20 bars. Then the coffee will flow out to the cup.

To brew coffee, the user needs to slide the filter holder assembly or unit into the brewing head assembly or unit. The filter holder assembly or unit is comprised of a filter 15, a filter handle 14, filter holder 16 and the coffee chamber 13. The coffee is placed on the filter 15, and then the filter 15 is inserted into the filter holder 16. The coffee chamber 13 collects and releases the brewed coffee.

In another aspect of the invention, a motor is operatively linked to the rotate plate, rotate rod and front connection plate of Construction I or cam pin and connection plate of Construction II. The motor, which duplicates the functions performed by the handle, can be adapted by one of ordinary skill in the art to rotate the rotate plate and rotate rod to of the front connection plate of Construction I or the cam pin of Construction II to lock or unlock the brewing head assembly. A set of gears may be connected to the cabinet filter holder unit and the motor so that the movement of the cabinet filter holder is made automatic without manual intervention. In an embodiment, a button is pressed to open the rotate and lock assembly to allow the user to place the filter with coffee into the cabinet filter holder assembly or unit. The user then press a button to operate the motor used to slide in the cabinet and close the lock and/or the brewing head unit. In another aspect of the invention, the motor can be operated by remote control.

III. Rotate to Lock Assembly of Construction III

This invention provides a brewing head assembly or unit, as illustrated in FIGS. 11-16, of a coffee maker comprising: a rotate to lock assembly, a sealing assembly and a filter holder assembly or unit, operatively linked to sustain pressure of at least 5 bars. In an embodiment, the above-described rotate to lock assembly, a sealing assembly and a filter holder assembly or unit, operatively linked to sustain pressure of at least 10 bars. In an embodiment, the above-described rotate to lock assembly, a sealing assembly and a filter holder assembly or unit, operatively linked to sustain pressure of at least 15 bars. In further embodiment, the above-described rotate to lock assembly, a sealing assembly and a filter holder assembly or unit, operatively linked to sustain pressure of at least 20 bars of pressure.

This invention provides a rotate to lock assembly, comprising a handle 13, a rotation pole 20 having a protruding member 20A, a moving rod 22, a support base 17 having two protruding members 17A, a copper shaft 23, a slider plate 1 having upper protruding member 1A and lower protruding member 1B, a slider plate holder 15, a shower head 14 and four brushing short 3. The handle 13 and the rotation pole 20 are moveably joined to the protruding member 17A of the support base 17, at a position as indicated by arrow A in FIG. 14. One end of the moving rod 22 is moveably joined to the protruding member 20A of the rotation pole 20 by a copper shaft 23, at a position as indicated by arrow B in FIG. 14, and the other end of the moving rod 22 is movably joined to the upper protruding member 1A of the slider plate 1, at a position as indicated by arrow C in FIG. 14. The slider plate 1 is guided by the slider plate holder 15 with four brushing short 3, which are moveably joined to the upper and lower protruding member 1A and 1B, respectively, at a position as indicated by arrow D in FIG. 14. The slider plate holder 15 is attached to the support base 17. The shower head 4 is attached to the bottom of the slider plate 1. In an embodiment, the rotate to lock assembly is as shown in FIG. 13.

This invention provides a sealing assembly comprising a seal ring 24, when is installed on to the shower head 4. A water spreader 6 is fixedly attached to shower head 4 by a spreader holder 6. In an embodiment, the seal ring is fabricated from silicon rubber, or elastomeric or other suitable material capable of providing water-tight and/or pressure-tight seal under pressure and/or elevated temperature. Suitable materials which can be used to fabricate the seal ring are readily determinable by one of ordinary skill in the art. In another embodiment, the sealing assembly is as shown in FIG. 13.

This invention provides a filter holder assembly or unit, comprising a filter 7, filter basket 8 and a filter handle 10. In an embodiment the filter is fabricated from metal, plastic or other suitable material. Suitable materials which can be used to fabricate the filter are readily determinable by one of ordinary skill in the art. In another embodiment, the filter holder assembly or unit is as shown in FIG. 13.

The operation of the locking mechanism of an embodiment of the present invention, i.e., Construction III, is as follows:

To prevent the leakage of the water from the brewing head, a silicone rubber seal ring 24 is used on the brewing head assembly or unit. The silicone rubber sealing ring 24 is fixed onto the shower head 4. See FIG. 13.

To operate the rotate to lock assembly, a handle 13 is rotated upwards in the direction of arrow E, as shown in FIG. 14, until the metal handle 13 is approximate 100 degrees with the horizontal. See FIG. 14. A rotation pole 20 is moveably linked to each side of the handle 13 at a position as indicated by arrow A in FIG. 14. When the rotation pole 20 rotates, it causes the moving rod 22 to swing up in the direction of arrow F, as shown in FIG. 14. The upward movement of the moving rod 22 causes the slider plate 1 to move upward, as indicated by arrow G in FIG. 14. The shower head 4, which is attached to the bottom of the slider plate 1 also moves upward with the slider plate 1. See FIG. 14. The clamp force on the filter holder 11 is released by lifting the shower head 4 with the rotation pole 20 and the handle 13. Once the brewing head assembly or unit is in the opened position, the user can insert or slide-in the cabinet filter holder assembly or unit in the direction of arrow H, as shown in FIG. 14, or pull out the filter holder assembly or unit. See FIG. 14.

To brew coffee, the cabinet filter holder 11 is inserted into the support base 17 of filter holder assembly or unit. The cabinet filter holder 11 is supported by a filter holder support plate 18 attached to the bottom of the support base 17. The cabinet filter holder 11 can also be supported by guides located on either side of the cabinet filter holder 11, i.e., see 11A, and corresponding recesses or protrusions located on the support base 17. Then the handle 13 is rotated downward in the direction of arrow K, as shown in FIG. 14, until the handle is 0 degree or parallel with the horizontal to the locked or closed position. The rotation pole 20 has a stopper to make the moving rod 22 stop at a pre-selected position, for example to stop or hold the handle 13 at about 90 degree with the horizontal.

See FIGS. 15 and 16. The downward movement of the handle 13 causes the rotation pole 20 and the moving rod 22 to swing or move downward. And causes the slider plate and the sealing assembly or unit to also move downward and lower into the filter basket 8. See FIG. 15. Once the sealing assembly or unit is lowered into the filter basket 8, the compression force exerted on the sealing ring 24 by the shower head 4 through the rotate to lock assembly on the filter basket 8 will form water- and/or pressure-tight seal between the filter basket 8 and the shower head 4. In an embodiment, the sealing ring can seal up to at least 20 bars. During the brewing cycle, the hot water and/or steam is released from the boiler 19 and/or heating system when the pump is turned on. The steam and/or hot water are delivered into the area between the shower head 4 and the filter basket 8 by a suitable tube. The pressure, i.e., from the pump, will make the shower head move upward in the direction of arrow L, as shown in FIG. 16B, which also causes the moving rod to swing upward in the direction of arrow M, as shown in FIG. 16B. The stopper 30, as shown in FIG. 16B, on the rotation pole will prevent the moving rod 22 from swinging upward completely. The stopper 30 ensures that the inter-locking force on the shower head 4 is maintained so that the sealing assembly or unit can not be unlocked.

To brew coffee, the user needs to slide the filter holder assembly or unit into the brewing head assembly or unit. The filter holder assembly or unit is comprised of a filter 7, a filter basket 8, filter handle 10, a foam system 9 and a cabinet filter holder 11. The coffee is placed on the filter basket 8, and then the filter is inserted into the cabinet filter holder 11. The filter holder collects and releases the brewed coffee.

In another aspect of the invention, a motor is operatively linked to the rotation pole 20 of the brewing head of Construction III. The motor, which duplicates the functions performed by the handle, can be adapted by one of the ordinary skill in the art to rotate the rotation pole 20 of the brewing head of Construction III to lock or un-lock the brewing head assembly. A set of gears may be connected to the cabinet filter holder assembly or unit and the motor so that the movement of the cabinet filter holder assembly or unit is made automatic without manual intervention. In an embodiment, a button is pressed to open the rotate to lock assembly to allow the user to place the filter 7 with coffee into the cabinet filter holder assembly or unit. The user then presses a button to operate the motor used to slide in the cabinet filter holder and close the lock and/or the brewing head unit. In another aspect of the invention, the motor can be operated by a remote control.

What is claimed is:

1. A brewing head of a coffee machine, comprising:
   (a) a rotate to lock assembly, which comprises a handle having two ends, wherein each end of the handle is movably joined to one end of a rotate plate, a rotate rod and a top frame by a fixed pin; wherein one member of a back connection plate is fixedly attached to each side of the top frame and the other member of the back connection plate is movably joined to a support base; wherein the top end of a front connection plate is moveably joined to the other end of the rotate plate, and the lower end of the front connection plate is moveably joined to the support base;
   (b) a filter holder assembly, which comprises a filter, a filter handle, a filter holder and a coffee chamber; wherein the filter contains a flange; and
   (c) a sealing assembly, which comprises a seal ring, inserted between a water connection plate and a water spreader; wherein a water outlet valve, a water outlet spring, the seal ring, the water spreader are fixedly attached to the water connection plate by a water outlet valve holder; wherein the water connection plate is fixedly attached to the top frame; wherein the water connection plate contains an opening for connecting the water connection plate to a hose for delivering heated and/or pressurized fluid from a boiler, in the closed position, the handle is rotated downward to move the front connection plate to a vertical position; wherein the seal ring forms a pressure- and/or water-tight seal with the flange of the filter; wherein the rotate-to-lock assembly, the filter holder assembly and the sealing assembly are operatively linked to sustain pressure, advantageously up to at least twenty bars.

2. The brewing head according claim 1, wherein the filter holder assembly comprises a flange to provide linear sliding movement of the cabinet filter holder relative to the brewing head.

3. The brewing head according to claim 2, wherein the sliding movement of the cabinet filter holder is driven by at least one motor or operated by a remote control.

4. The brewing head according to claim 1, wherein the opening and closing of the rotate to lock assembly is driven by at least one motor or operated by a remote control.

5. The brewing head according to claim 1, wherein the cabinet filter holder is inserted into the support base from above; or wherein the cabinet filter holder is inserted horizontally from the side of the support base.

6. The brewing head according to claim 1, wherein top frame is pivotable from the horizontal relative to the support base to the opened position by an inclination angle of between about 5° to 55°.

7. The brewing head according to claim 1, further comprising a generator for producing hot fluid, or a generator for producing hot gaseous fluid, or a generator for producing pressurized hot fluid.

8. A brewing head according to claim 7, wherein the generator, boiler or heating system is detached from the brewing head unit, or connected to the brewing head by a hose.

9. A brewing head of a coffee machine, comprising:
  (a) a rotate to lock assembly, which comprises a handle having two ends; wherein each end of the handle is moveably joined to a cam pin and a top frame; wherein one member of each connection plate is fixably attached to each side of the top frame by hinge pins and moveably joined to the cam pin; wherein the other member of each connection plate is pivotably joined to a support base;
  (b) a filter holder assembly, which comprises a filter, a filter handle, a filter holder and a coffee chamber; wherein the filter contains a flange; and
  (c) a sealing assembly, which comprises a seal ring, inserted between a water connection plate and a water spreader; wherein a water outlet valve, a water outlet spring, the seal ring, the water spreader are fixedly attached to the water connection plate by a water outlet valve holder; wherein the water connection plate is fixedly attached to the top frame; wherein the water connection plate contains an opening for connecting the water connection plate to a hose for delivering heated and/or pressurized fluid from a boiler,
in the closed position, the handle is rotated downward to lower the connection plate; wherein the seal ring forms a pressure- and/or water-tight seal with the flange of the filter; wherein the rotate-to-lock assembly, the filter holder assembly and the sealing assembly are operatively linked to sustain pressure, advantageously up to at least twenty bars.

10. The brewing head according claim 9, wherein the filter holder assembly comprises a flange to provide sliding movement of the cabinet filter holder assembly relative to the brewing head.

11. The brewing head according to claim 10, wherein the sliding movement of the cabinet filter holder assembly is driven by at least one motor or operated by a remote control.

12. The brewing head according to claim 9, wherein the opening and closing of the rotate to lock assembly is driven by at least one motor.

13. The brewing head according to claim 12, wherein the motor is operated by a remote control.

14. The brewing head according to claim 9, wherein the cabinet filter holder is inserted horizontally from the side of the support base.

15. The brewing head according to claim 9, wherein top frame is pivotable from the horizontal relative to the support base to the opened position by an inclination angle of between about 10°.

16. The brewing head according to claim 9, further comprising a generator for producing hot fluid, or a generator for producing hot gaseous fluid, or a generator for producing pressurized hot fluid.

17. A brewing head according to claim 16, wherein the generator, boiler or heating system is detached from the brewing head unit, or connected to the brewing head by a hose.

18. The brewing head according to claim 3, wherein the movement of the cabinet filter holder is controlled by a software program.

19. The brewing head according to claim 4, wherein the opening and closing of the rotate to lock assembly is controlled by a software program.

20. A brewing head of a coffee machine, comprising:
  (a) a rotate to lock assembly, which comprises a handle having two ends, wherein each end of the handle is joined to a rotation pole having a protruding member 20A, wherein each rotation pole is moveably attached to a protruding member 17A of a support base, wherein the protruding member 20A is moveably joined to one end of a moving rod, wherein the other end of the moving rod is moveably joined to a upper protruding member 1A of a slider plate, wherein the movement of the slider plate is guided by the slider plate holder attached the support base; wherein a shower head is attached to the bottom of the slider plate;
  (b) a filter holder assembly, which comprises a filter, a filter basket, a filter handle, a filter holder and a coffee chamber; wherein the filter contains a flange; and
  (c) a sealing assembly, which comprises a seal ring fixed on the shower head; wherein a water spreader is attached to the shower head by a spreader holder; wherein the pressurized or heated fluid and/or steam from the boiler is delivered to the shower head by a tube or pipe,
in the closed position, the handle is rotated downward to move the rotation pole, which causes the moving rod to swing or move downward; wherein the slider plate which is attached to one end of the moving rod lowers the shower head onto the filter basket; wherein the seal ring on the shower head forms a water- and pressure-tight seal, capable of sustaining pressure up to 20 bars.

21. The brewing head according to claim 20, wherein the filter holder assembly further comprises the foam maker for producing foam coffee or coffee with froth.

22. The brewing head according to claim 21, wherein the foam maker is attached to the bottom of the filter basket.

23. The brewing head according to claim 20, wherein the rotate to lock assembly further comprises a stopper 30 attached to at least one protruding member 17A of the support base.

24. The brewing head according to claim 23, wherein the stopper is adapted to prevent rotate to lock assembly from unlocking while under pressure.

25. The brewing head according to claim 24, wherein the stopper is adapted to hold the shower head at a partially open position.

26. The brewing head according to claim 20, wherein the opening and closing of the rotate to lock assembly is driven by at least one motor or operated by a remote control.

27. The brewing head according to claim 20, wherein the cabinet filter holder is inserted horizontally from the side of the support base.

28. The brewing head according to claim 20, wherein top frame is pivotable from the horizontal relative to the support base to the opened position by an inclination angle of between about 100°.

29. The brewing head according to claim 20, further comprising a generator for producing hot fluid, or a generator for producing hot gaseous fluid, or a generator for producing pressurized hot fluid.

30. A brewing head according to claim 29, wherein the generator, boiler or heating system is detached from the brewing head unit, or connected to the brewing head by a hose or tube.

* * * * *